May 17, 1938. S. T. CROSBY 2,117,403
TOILET ACCESSORY
Filed Feb. 24, 1936
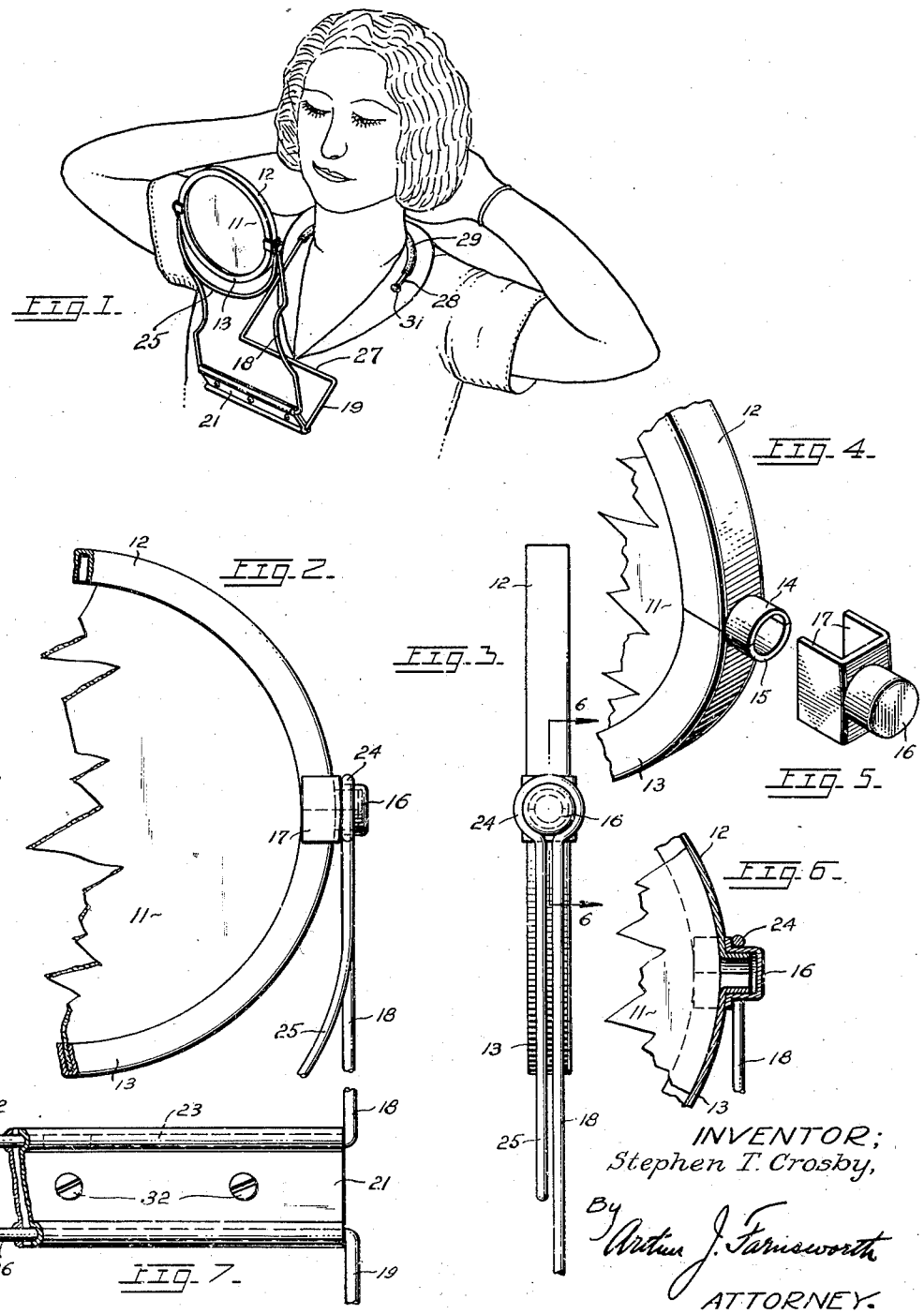
INVENTOR;
Stephen T. Crosby,
By Arthur J. Farnsworth
ATTORNEY.

Patented May 17, 1938

2,117,403

UNITED STATES PATENT OFFICE 2,117,403

TOILET ACCESSORY

Stephen T. Crosby, Los Angeles, Calif.

Application February 24, 1936, Serial No. 65,314

2 Claims. (Cl. 88—101)

In this specification, and the accompanying drawing, I shall describe and show preferred embodiments of my invention, and specifically mention certain of the more important objects. I do not limit myself to the exact forms disclosed however, since various changes and adaptations may be made therein without departing from the essence of the invention as hereinafter claimed.

My invention relates to portable mirrors of the kind that are used for toilet accessories in cooperation with fixed mirrors as for viewing one's back while dressing the hair, etc. Among its principal objects are: first, to provide an article of this kind that may be conveniently supported upon the person of the user, in such a manner as to leave both hands free; second, to secure in such a device a capacity to function, at the will of the user, in almost precisely the same way as the familiar hand mirror that now is commonly employed; and, third, to accomplish the stated objects in a simple practical, and relatively inexpensive construction.

My objects are attained in the manner illustrated in the accompanying drawing, in which—

Figure 1 is a perspective view of my complete invention, positioned upon the person of a user;

Figure 2 is a fragmentary elevation showing the mirror portion of the device, and the method of its attachment to its supporting structure;

Figure 3 is a side elevation of the parts shown in Fig. 2;

Figure 4 is a fragmentary perspective view of the mirror and its frame by themselves, prior to being assembled upon the supporting structure;

Figure 5 is a perspective view of one of the clips by which the mirror frame is assembled;

Figure 6 is a fragmentary elevation in central section, taken on the line 6—6 of Fig. 3, showing how the mirror frame, clips, and adjacent portions of the supporting structure, are assembled; and Figure 7 is a fragmentary elevation of the adjustable positioning element for the cooperating parts of the mirror support.

Similar reference numerals refer to similar parts throughout the several views.

In the form of my invention that has been selected for illustrative purposes, I employ a circular mirror, of which the back side is shown at 11. It is entirely feasible to use a pair of such mirrors placed back to back; and, when this is done, one of them preferably should be a plain mirror, and the other a magnifying mirror.

Mirror 11 is held by two-semi-circular half frame parts 12 and 13, which have channel cross-sections. The dimensions of these frame halves are such that the mirror, and whatever backing it may have, is held snugly. Each extremity of the half frames is formed with a laterally projecting half trunnion, as shown at 14 and 15 in Fig. 4. These trunnions may take the semi-cylindrical form illustrated, in which case they may be made integral with the respective frame halves, by the use of suitable dies in well known ways.

Clips of the kind shown in Fig. 5, which may be formed as integral units, are used to assemble the mirror in its two half frames. These clips comprise; a cylindrical ferrule portion 16, adapted to be slipped snugly over a cooperating pair of opposed half trunnions 14 and 15, to hold them together; and opposed parallel side wings 17, which are adapted to slip snugly over, and to cover up, the joint between the semi-circular frame halves of the mirror.

The mirror, assembled in its frame in the manner described, is mounted upon a suitable supporting structure, comprising an upright portion 18, a base portion 19, and a friction clamp 21 connecting them. Portions 18 and 19 preferably are made of resilient wire which may be distorted considerably, and which will then spring back into the desired form; and each of these portions consists of a single piece, formed in the manner illustrated.

The upright portion of the supporting structure has its two extremities 22 and 23 opposed, and engaged by clamp 21, as shown in Fig. 7; and there are two opposed intermediate loops, of which one is shown at 24, adapted to engage ferrules 16. Moreover, the portion 25 of the upright frame, that connects the two loops, is formed so that the loop portions must be sprung apart before the ferrules can be engaged, and the loops themselves must be sprung open slightly for this engagement.

The base portion of the supporting structure has an extremity 26 that is engaged by clamp 21, as shown in Fig. 7. It also has a cross bar 27, parallel to and spaced from extremity 26; and a curved hook portion 28 that is adapted to engage the neck of the user. A piece of rubber tubing 29 is provided to cover the curved hook, so that the user will not be subjected to unpleasant temperature shocks, and a button 31, at the extremity of the hook, prevents the tubing from coming off, and obviates the possibility of scratching by the extremity.

Pressure of clamp 21 upon the extremities of the two cooperating wire parts of the supporting structure may be regulated by the screws 32; and, if desired, ornamentally headed bolts and thumb nuts may be substituted for these screws.

It will be obvious that the device may be firmly positioned upon the breast of the user; and friction clamp 21 may be adjusted by turning, to place the mirror at the desired height, and at the desired distance from the face of the user. The mirror itself may then be swung about the axis of its trunnions, to secure the correct reflection. The hands of the user will then be entirely free for doing whatever is desired. Although the device may be used most conveniently in the manner illustrated in Fig. 1, it may also be used in cooperation with a fixed mirror (not shown) for reflecting the back of the user. A slight swaying or other movement of the body, in a manner that will be quickly acquired, will enable any portion of the back of the user to be seen when a cooperating fixed mirror is employed.

It will be noted that all adjustments, including the swinging of the mirror about its trunnions, are made by turning frictionally engaged parts. It will also be seen that the construction permits of assembling all of the parts without the use of solder, brazing, or rivets. Finally it will be observed that the device presents a most attractive appearance, and that it is relatively inexpensive to produce in such suitable material as duralumin.

The previously called "upright portion of the supporting structure", designated by numerals 18, 22, 23, 24 and 25, obviously is a swingable mirror arm in fact. One end of this arm, designated by the numerals 22 and 23 (Fig. 7), is adjustably positioned upon the base structure 19 and 26, in such a manner that the other end of the arm, where the two opposed spaced loops 24 are formed, is free to swing in a vertical plane.

Having thus fully described my invention, I claim:

1. A device of the character described, comprising a mirror having one or more reflecting surfaces, a sectional frame enclosing said mirror, portions projecting from adjacent extremities of said frame sections to form generally coaxial trunnions, a standard including portions in tension, and means carried by the tension portions and engageable with said trunnions for pivotally supporting the mirror with respect to said standard and maintaining said frame sections in assembly under the influence of said tension portios.

2. A device of the character described, comprising a mirror having one or more reflecting surfaces, two symmetrical frame sections cooperatively enclosing said mirror, adjacent ends of said frame sections having cooperative portions projecting therefrom to form generally coaxial extensions, a trunnion encompassing and engaging each of said extensions, means extending from said trunions and engageable with said mirror sections for holding the same in alignment, a standard including portions in tension each of which is bent to form a loop contacting said frame alignment means for maintaining said frame sections in assembly under the influence of said tension portions, each of said trunnions being frictionally held within a loop and in engagement therewith by reason of tension in each loop, whereby to maintain the mirror in various positions relative to said standard.

STEPHEN T. CROSBY.